(12) United States Patent
Kittel et al.

(10) Patent No.: US 6,420,447 B1
(45) Date of Patent: Jul. 16, 2002

(54) VISCOELASTIC DAMPING FOAM HAVING AN ADHESIVE SURFACE

(75) Inventors: Christoph Kittel, Nienhagen; Gerhard Burak, Adelheidsdorf; Carsten Kliwer, Nienhagen; Cornelia Peters, Wolthausen, all of (DE)

(73) Assignee: Stankiewicz GmbH, Adelheidsdorf (DE)

( * ) Notice: Subject to any disclaimer, the term of this patent is extended or adjusted under 35 U.S.C. 154(b) by 0 days.

(21) Appl. No.: 08/204,162

(22) PCT Filed: Aug. 5, 1992

(86) PCT No.: PCT/EP92/01780
§ 371 (c)(1),
(2), (4) Date: Jun. 22, 1994

(87) PCT Pub. No.: WO93/05091
PCT Pub. Date: Mar. 18, 1993

(30) Foreign Application Priority Data

Sep. 6, 1991 (DE) ............................................. 41 29 666
Aug. 5, 1992 (WO) ............................... PCT/EP92/01780

(51) Int. Cl.$^7$ ........................... C08J 9/04; C08G 18/48; E04B 1/84; G10K 11/16
(52) U.S. Cl. ..................... 521/174; 156/331.7; 181/288; 181/290; 181/294; 521/51; 521/170; 521/914
(58) Field of Search .................................. 521/170, 174, 521/914, 51; 156/331.7; 181/288, 290, 294

(56) References Cited

U.S. PATENT DOCUMENTS

| | | | | |
|---|---|---|---|---|
| 3,874,964 A | * | 4/1975 | Cogliano et al. | 521/176 |
| 4,259,452 A | | 3/1981 | Yukuta et al. | 521/52 |
| 4,276,385 A | * | 6/1981 | Tenhagen | 521/137 |
| 4,302,552 A | * | 11/1981 | Hongu et al. | 521/176 |
| 4,303,755 A | | 12/1981 | Yukuta et al. | 521/52 |
| 4,304,872 A | * | 12/1981 | Tenhagen | 521/137 |
| 4,367,259 A | * | 1/1983 | Fulmer et al. | 521/137 |
| 4,374,172 A | | 2/1983 | Schwarz et al. | 428/308.4 |
| 4,374,935 A | * | 2/1983 | Decker et al. | 521/173 |
| 4,689,357 A | * | 8/1987 | Hongu et al. | 521/176 |
| 4,698,408 A | | 10/1987 | Goel et al. | 528/48 |
| 4,722,946 A | * | 2/1988 | Hostettler | 521/159 |
| 4,782,099 A | | 11/1988 | Dietrich et al. | 521/175 |
| 4,839,397 A | | 6/1989 | Lohmar et al. | 521/159 |
| 4,980,386 A | * | 12/1990 | Tiao et al. | 521/129 |
| 4,987,156 A | * | 1/1991 | Tozune et al. | 521/130 |
| 5,063,251 A | | 11/1991 | Bergishagen | 521/82 |
| 5,063,253 A | * | 11/1991 | Gansen et al. | 521/174 |

FOREIGN PATENT DOCUMENTS

| | | |
|---|---|---|
| DE | 2547697 | 4/1977 |
| DE | 4001044 | 7/1991 |
| EP | 0367283 | 5/1990 |
| GB | 1236156 | 6/1971 |
| GB | 1480972 | 7/1977 |
| GB | 2028353 | 3/1980 |

OTHER PUBLICATIONS

Advances in Polyurethane Technology, edited by Buist and H. Gudgeon, p. 196. Elsevier Pub. Co. Ltd., London (1970).
Polyurethane Technology, edited by Bruins, p. 4, Interscience Publishers, New York (1969).

* cited by examiner

*Primary Examiner*—Rabon Sergent
(74) *Attorney, Agent, or Firm*—Scully, Scott, Murphy & Presser

(57) ABSTRACT

The invention relates to a viscoelastic damping foam with an adhesive surface for adhesion coupling to vibrating surfaces, for solid-borne sound absorption. The viscoelastic damping foam is obtained through the stoichiometric reaction of a polyisocyanate with at least two polyols of the polyether type which are incompatible with one another.

6 Claims, No Drawings

VISCOELASTIC DAMPING FOAM HAVING AN ADHESIVE SURFACE

The invention relates to a visco-elastic damping foam with an adhesive surface for adhesion coupling to vibrating surfaces for solid-borne sound absorption.

Extremely varied polyurethane soft foamed materials are known for sound-insulation which, however, unlike the foamed material according to the invention, are not suitable for sound deadening (anti-drumming). DE-AS 19 23 161 and DE-OS 28 35 329 describe foamed materials filled with minerals which, because of their high density of 500 to 1,250 kg/m$^3$, enable good sound blocking. Sound-deadening (anti-drumming) of sheet metal is, however, not possible with these materials since the loss factor of these foamed materials is too low.

DE-PS 27 56 622 focuses on the manufacture of foamed materials with high loss factors, but the method described, namely the impregnation of open-pored polyurethane foamed materials or PVC foamed materials with visco-elastic materials, for example polyolefins containing inorganic fillers or organic resins or waxes, involves considerable outlay.

It is known from DE-OS 37 10 731.3 that polyurethane soft foamed materials with adhesive properties can be obtained when a polyisocyanate or a polyisocyanate prepolymer is reacted with polyols or mixtures thereof present in excess, whilst keeping an NCO index of $\leq 80$. The sub-cross-linking of isocyanate and polyol is used in order to arrive at the desired surface properties. The foamed materials able to be produced according to this state of the art however have the disadvantage that the mechanical characteristic values turn out unfavourably as compared to foamed materials based on two-component polyurethane which are produced with the stoichiometric ratio.

Consequently the object of the invention is to provide a visco-elastic foamed material, which is produced on the basis of polyurethane in stoichiometrically balanced quantities of polyol and isocyanate with the usual additives. This visco-elastic foamed material produced thus has adhesive surfaces for adhesion coupling to vibrating surfaces and has the required characteristics for sound-proofing. For the lining or covering material itself, this concerns the loss factor $d_2$, according to DIN 53 440, and the modulus of elasticity $E_2$.

This object is achieved according to the invention in that the isocyanate is reacted in stoichiometric quantities with at least two polyols, preferably of the polyether type, which are incompatible with one another. The two polyols are able to be mixed together, but only because of their high viscosity or syrupy consistency. They are however incompatible with one another because they separate completely after some time. The process of separation occurs relatively slowly because it has to "work" against the viscosity.

The polyether polyols used are characterised by a hydroxyl number $\leq 100$ and are produced on the basis of approximately 75% ethylene oxide in the presence of a starter. Common polyether polyols are based for example on 15 to 20% ethylene oxide. Mixtures of these two types of polyether polyol are incompatible with one another. Polyether polyols produced on a high ethylene oxide basis are used according to the state of the art as cell openers, at approximately 0.5% to 5% relative to the total mixture. Compositions according to the present invention contain clearly greater quantities in contrast to this, for example 50%.

The polyether polyol produced on a low ethylene oxide basis tends to be more reactive than the polyol on a high ethylene oxide basis which therefore accumulates on the outer surfaces. The reaction in the foamed part occurs in a stoichiometrically balanced manner. No sub-cross-linking takes place, rather the adhesive surface is based surprisingly on the action of functional groups. The adhesiveness achieved according to the invention is produced with a functionality of the polyether polyol on a high ethylene oxide basis of 2 to 4.

In the exothermal reaction of polyols with isocyanate a higher temperature is produced, when filling the tool, in the inner core zones of the part being produced than at the outer regions or on the surfaces. The heat quickly dissipates over the surface of the tool. Because of the low temperature in the surface region of the foamed part being produced, the reaction speed is reduced there, as a result of which the separation of the at least two polyols which are incompatible with one another begins.

Because of the necessary heat elimination the workpiece can only be heated to a moderate degree because the adhesive surfaces are not otherwise produced. Two exemplary formulae are found in the following for embodiments of the foam mixtures according to the invention. The production of the products occurs preferably through the supply of the reaction components, the polyol system, on the one hand, and the polyisocyanate system, on the other hand, into the mixing head of an RIM (Reaction Injection Moulding) unit.

Two different formulae were tested for the polyol system (component A), formula 1 with a high proportion of a polyether polyol on ethylene oxide basis and formula 2 with a low proportion of the polyether polyol on ethylene oxide basis. The reaction between component A and the polyisocyanate (component B) was carried out in stoichiometric quantities as described above. Component A is composed as follows:

| Component A: | |
|---|---|
| Formula 1 | Formula 2 |
| 400 parts by weight | 800 parts by weight Desmophen 3900 |
| 800 parts by weight | 400 parts by weight Arcol 2580 |
| 40 parts by weight | 40 parts by weight Water |
| 20 parts by weight | 20 parts by weight DMEA |
| 2.4 parts by weight | 0.6 parts by weight Tegostab B 1400 |
| 8 parts by weight | 8 parts by weight DABCO TD 100 |
| 16 parts by weight | 16 parts by weight Dipropylene glycol | wherein

Desmophen 3900 is a polyether polyol based on propylene oxide with a proportion of approximately 18% ethylene oxide, a molecular weight of 4800 and a hydroxyl number of 35;

Arcol 2580 is a polyether polyol based on ethylene oxide with a proportion of approximately 70% ethylene oxide, a starter for example TMP (=trimethylol propane), a molecular weight of 4000 and a hydroxyl number of 42;

DMEA is the same as dimethyl ethylamine and is added as an adjuvant;

Tegostab B 1400 is a cell stabiliser and

DABCO TD 100 is the same as triethylene diamine and acts as a catalyst for cross-linking and foaming.

Component B consists of diphenylmethane-4,4-diisocyanate with an NCO content of 28%, for example prepolymer Suprasec VM 27, but other isocyanates such as for example raw MDI are also possible.

The stoichiometric ratio of A:B is 100 parts by weight A: 46 parts by weight B.

The ratio of polyether polyol based on propylene oxide relative to the polyether polyol based on ethylene oxide is in the example 2:1 or 1:2. The formulae listed are. basic formulae, which can be altered in accordance with the object to be achieved by the invention. The desired adhesiveness of the foamed materials thus produced can be regulated by means of the proportion of Arcol 2580. The higher the proportion of polyether polyol on ethylene oxide basis, the greater the adhesiveness of the foamed material. As further tests have shown, the ratio of the polyether polyol on propylene oxide basis relative to the polyether polyol on-ethylene oxide basis can be brought approximately to a weight ratio of 5:1 to 1:5, as a result of which the adhesiveness can be finely graded.

The desired adhesiveness of the foamed materials thus produced can be regulated by means of the proportion of the Arcol 2580, the higher the proportion of the polyether polyol on ethylene oxide basis, the greater the adhesiveness of the foamed material.

Sample bodies were taken from the foamed parts thus produced and tested with regard to the physical-acoustic parameters. Values were found for the loss factor $d_2 \geq 0.4$ and for the modulus of elasticity $E_2 \leq 150,000$ N/m². The material density (specific gravity) is a secondary consideration, because it is substantially determined by the production process and by the geometry of the mould. As a rough indicator value, it may be that values between 60 and 150 kg/m³ appear for parts like those usually used for sound-proofing in the end wall-floor region of a vehicle.

The application of the visco-elastic damping foams with adhesive surfaces is not restricted to solid-borne sound damping of vibrating surfaces, but extends to utilization as an acoustic spring element in so-called mass-spring systems on any vibrating and sound-emitting surfaces. With greater layer thicknesses and particularly when used as a spring in the mass-spring system the airborne sound damping of the surfaces for sound-proofing is increased.

What is claimed is:

1. A viscoelastic damping foam having an adhesive surface comprising a stoichiometric reaction product of a polyisocyanate and a polyol reactant, said polyol reactant consisting essentially of a first polyether polyol based on propylene oxide and a second polyether polyol based on ethylene oxide, wherein said first and said second polyether polyols have hydroxyl numbers no greater than 100, and wherein said first polyether polyol and said second polyether polyol are present in a weight ratio of from 5:1 to 1:5.

2. A foam in accordance with claim 1 wherein said first polyether polyol and said second polyether polyol are incompatible with each other.

3. A foam in accordance with claim 1 wherein said first polyether polyol is based on propylene oxide and comprises between about 15% ethylene oxide and about 20% ethylene oxide and said second polyether polyol comprises between about 70% and about 75% ethylene oxide.

4. A foam in accordance with claim 3 wherein said weight ratio of said first polyether polyol to said second polyether polyol is 2:1 to 1:2.

5. A foam in accordance with claim 4 wherein said first polyether polyol comprises about 18% ethylene oxide and said second polyether polyol comprises about 70% ethylene oxide.

6. A process for absorbing solid-borne sound comprising adhesively coupling said adhesive surface of said viscoelastic foam of claim 1 to a vibrating surface.

* * * * *